(12) United States Patent
Weeden

(10) Patent No.: US 7,975,973 B1
(45) Date of Patent: Jul. 12, 2011

(54) CAMERA TREE MOUNT APPARATUS

(76) Inventor: Gary E. Weeden, Sioux Falls, SD (US)

( * ) Notice: Subject to any disclaimer, the term of this patent is extended or adjusted under 35 U.S.C. 154(b) by 273 days.

(21) Appl. No.: 12/420,174

(22) Filed: Apr. 8, 2009

(51) Int. Cl.
*A47B 96/06* (2006.01)
*A47G 29/00* (2006.01)
*A47K 1/00* (2006.01)

(52) U.S. Cl. ............... 248/217.4; 248/216.1; 248/216.4; 248/218.4; 248/219.3

(58) Field of Classification Search ............... 248/217.4, 248/217.3, 218.4, 216.4, 219.3, 216.1
See application file for complete search history.

(56) References Cited

U.S. PATENT DOCUMENTS

| | | | | |
|---|---|---|---|---|
| 704,666 | A * | 7/1902 | Stephens | 248/207 |
| 1,582,381 | A * | 4/1926 | Citero | 248/217.4 |
| 2,560,556 | A * | 7/1951 | Creedon | 248/217.4 |
| 5,626,322 | A * | 5/1997 | Braun | 248/282.1 |
| 5,649,257 | A | 7/1997 | Kempka | |
| 5,669,592 | A * | 9/1997 | Kearful | 248/217.4 |
| 5,723,808 | A | 3/1998 | Devall | |
| 5,967,475 | A * | 10/1999 | Johnson | 248/217.4 |
| 6,623,182 | B2 | 9/2003 | Tatera | |
| 7,345,707 | B1 | 3/2008 | McClain | |
| 7,789,607 | B2 * | 9/2010 | Fuest | 411/401 |
| 2003/0133708 | A1 | 7/2003 | Tatera | |
| 2006/0197001 | A1 | 9/2006 | Parker et al. | |
| 2008/0099655 | A1 | 5/2008 | Goodman | |

* cited by examiner

*Primary Examiner* — Amy J Sterling

(57) ABSTRACT

A camera tree mount apparatus includes a boring member that includes a coupler, a central body attached to the coupler and a drill head is attached the central body opposite of the coupler. The drill head is threaded and has a pointed free end to threadably bore the drill head into a tree trunk. The coupler has an outer end positioned distal to the central body. A shaft has a pair of threaded shaft ends one of which is attached to the coupler. A mounting panel has a peripheral edge having a threaded aperture therein. One of the shaft ends is extended into the threaded aperture and threadably coupled to the mounting panel. The mounting panel has at least one hole extending therethrough. A camera is mountable on the mounting panel after the drill head is extended into a tree to couple the camera to the tree.

14 Claims, 6 Drawing Sheets

CAMERA TREE MOUNT APPARATUS

BACKGROUND OF THE DISCLOSURE

Field of the Disclosure

The disclosure relates to camera mounting devices and more particularly pertains to a new camera mounting device for mounting a wildlife capturing camera to a tree.

SUMMARY OF THE DISCLOSURE

An embodiment of the disclosure meets the needs presented above by generally comprising a boring member that includes a coupler, a central body attached to the coupler and a drill head is attached the central body opposite of the coupler. The drill head has a free end that is pointed and the drill head is threaded to facilitate threadably boring the drill head into a tree trunk. The coupler has an outer end positioned distal to the central body. A shaft has a pair of threaded shaft ends one of which is attached to the coupler. A mounting panel has a peripheral edge having a threaded aperture therein. One of the shaft ends is extended into the threaded aperture and threadably coupled to the mounting panel. The mounting panel has at least one hole extending therethrough. A camera is mountable on the mounting panel after the drill head is extended into a tree to couple the camera to the tree.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
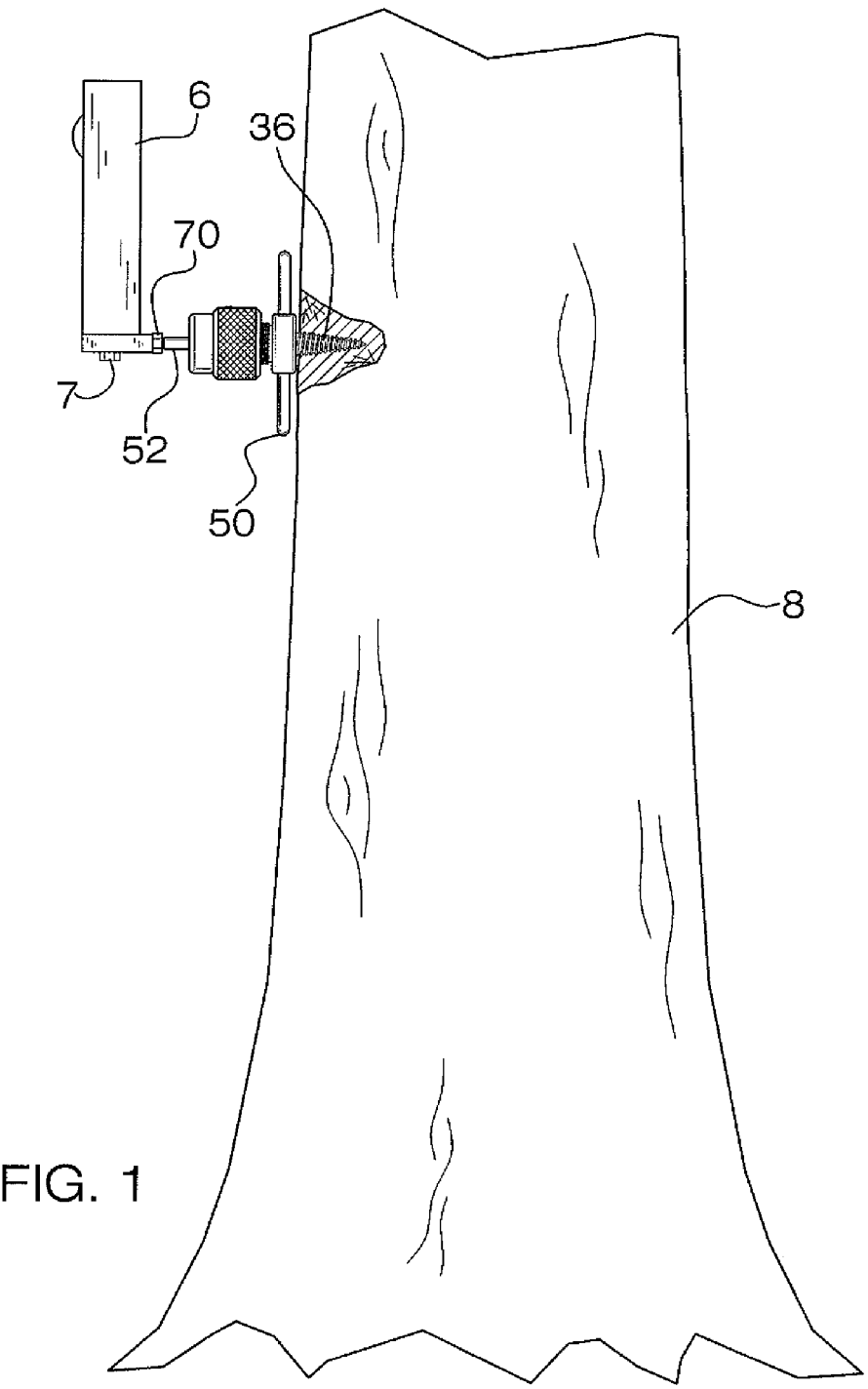
FIG. 1 is a side in-use view of a camera tree mount apparatus according to an embodiment of the disclosure.
Figure 2:
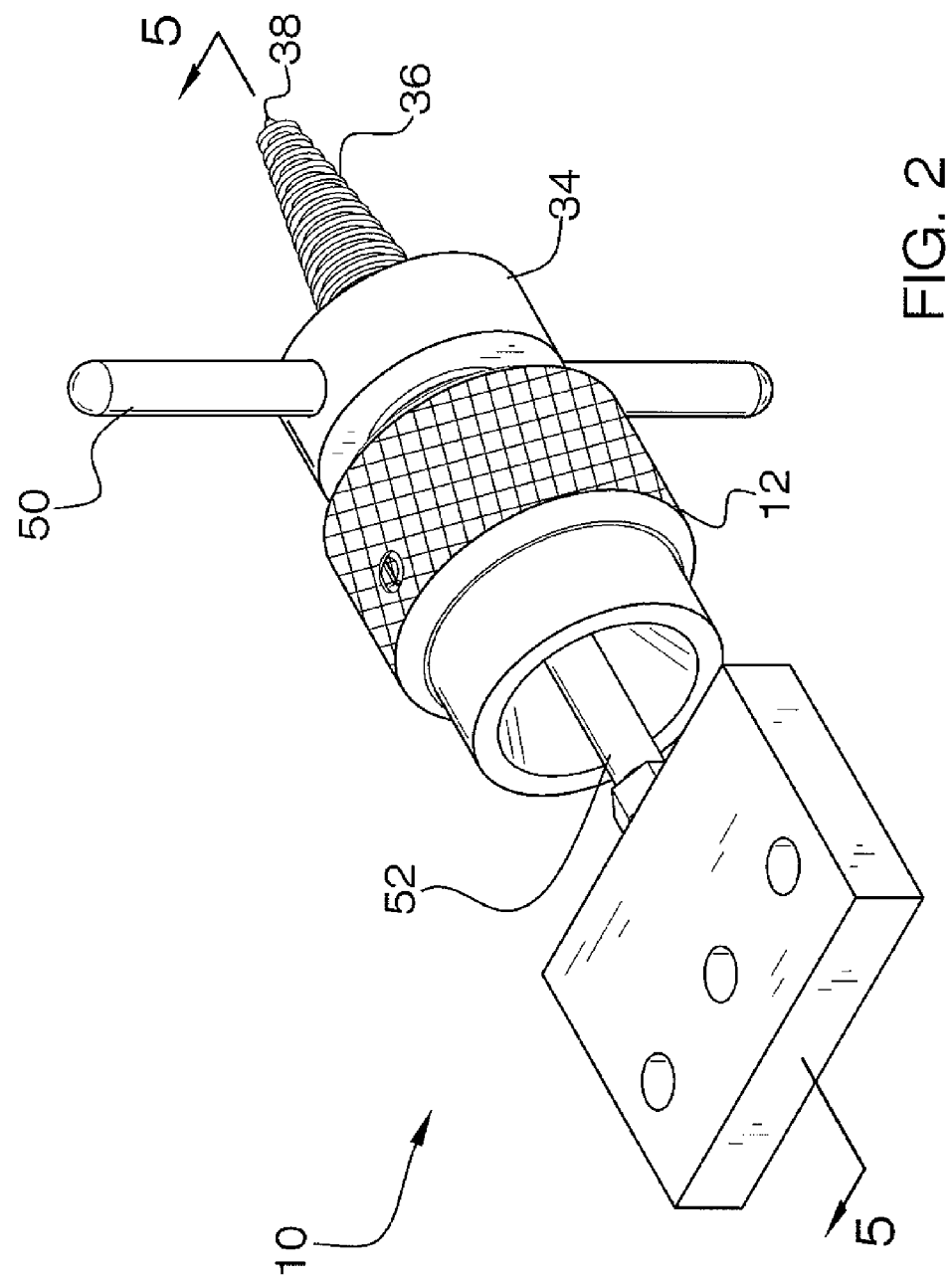
FIG. 2 is a back perspective view of an embodiment of the disclosure.
Figure 3:
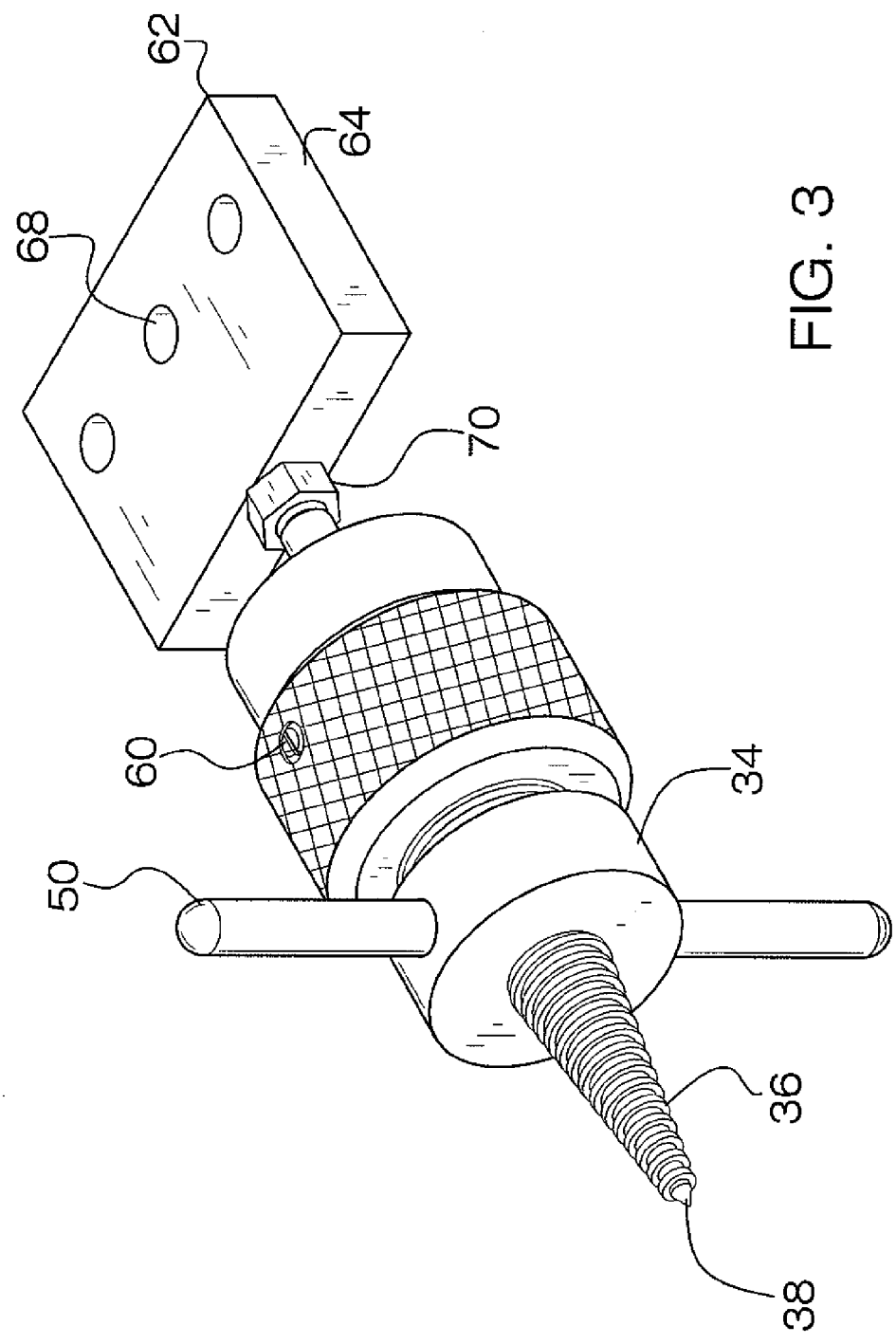
FIG. 3 is a front perspective view of an embodiment of the disclosure.

With reference now to the drawings, and in particular to FIGS. 1 through 6 thereof, a new camera mounting device embodying the principles and concepts of an embodiment of the disclosure and generally designated by the reference numeral 10 will be described.

As best illustrated in FIGS. 1 through 6, the camera tree mount apparatus 10 generally comprises a housing 12 that has a first end 14, a second end 16 and a perimeter wall 18 extending between the first 14 and second 16 ends. The first 14 and second 16 ends are open and the housing 12 has a passageway 20 extending therethrough and through the first 14 and second 16 ends. The passageway 20 has a peripheral wall 21 bounding the passageway 20. The passageway 20 includes a first section 22 adjacent to the first end 14, a second section 24 adjacent to the second end 16 and a central section 26 positioned between the first 22 and second 24 sections. The peripheral wall 21 adjacent to the first end 14 flares outwardly from the central section 26 to the first end 14. The first section 22 has a frusto-conical shape. The second section 24 is tubular and is threaded. The central section 26 defines an arcuately concave saddle having a base 28 abutting the first section 22. A spherical object is extendable into the second end 14 and abuttable against the base 28.

A boring member 30 includes a coupler 32, a central body 34 attached to the coupler 32 and a drill head 36 attached the central body 34 opposite of the coupler 32. The drill head 36 is conically shaped and has a free end 38 that is pointed. The drill head 36 is threaded to facilitate threadably boring the drill head 36 into a tree trunk 8 as shown in FIG. 1. The coupler 32 is removably extended into and coupled to the second end 16 of the housing 12. The coupler 32 threadably engages the second section 24 of the passageway 20. The coupler 32 has an outer end 40 positioned distal to the central body 34. The outer end 40 has a central area having a well 42 extending therein. The well 42 defines a female coupler that includes a threaded portion 46 and a faceted portion 48. The faceted portion 48 is positioned between the threaded portion 46 and the central body 34. 'Faceted' is being defined as having a plurality of side walls which are generally of equal size with respect to each other and are angled at a same angle with respect to each other. The side walls may number anywhere between 3 and 10 side walls with either a rectangular, pentagonal or hexagonal shape likely being used to fit to conventional bits used by electric drills to engage the heads of fasteners. This will allow a person to use an electric drill to bore the drill head 36 into the tree trunk 8.

A lever 50 to facilitate rotation of the boring member 30 extends through the boring member. The lever 50 is removably extended through the central body 34 and is orientated perpendicular to a longitudinal axis of the boring member 30 taken along a line extending through the coupler 32 and the free end 38.

A shaft 52 is extendable into the first end 14 of the housing 12 and into the central section 26. A fastener 54 is positioned in the central section 26 and engages the shaft 52 so that the shaft 52 extends outwardly from the first end 14. The fastener 54 comprises a ball threadably coupled to the shaft 52 and is rotational within the saddle, or central section 26, to allow an angle of the shaft 52 to be selectively adjusted with respect to the first end 14 of the housing 12. The shaft 52 has a pair of shaft ends 56, 58 each being threaded. One of the shaft ends 56 is threadably coupled to the fastener 54 or to the threaded portion 46 of the female coupler, or well 42. This allows a user of the apparatus 10 to threadably engage the shaft 52 directly to the boring member 30. The outer end 40 of the coupler 32 is releasably abutted against the ball, or fastener 54, to prevent rotation of the ball 54. The outer end 40 may be concavely arcuate to contour better with the ball 54. A lock screw 60 is threadably extended into the housing 12 and is removably abutted against the ball 54 to retain a positioning of the ball 54 with respect to the housing 12. The lock screw 60 may be used either in conjunction with or instead of the coupler 32 to prevent rotation of the ball 54 with respect to the housing 12.

Figure 4:
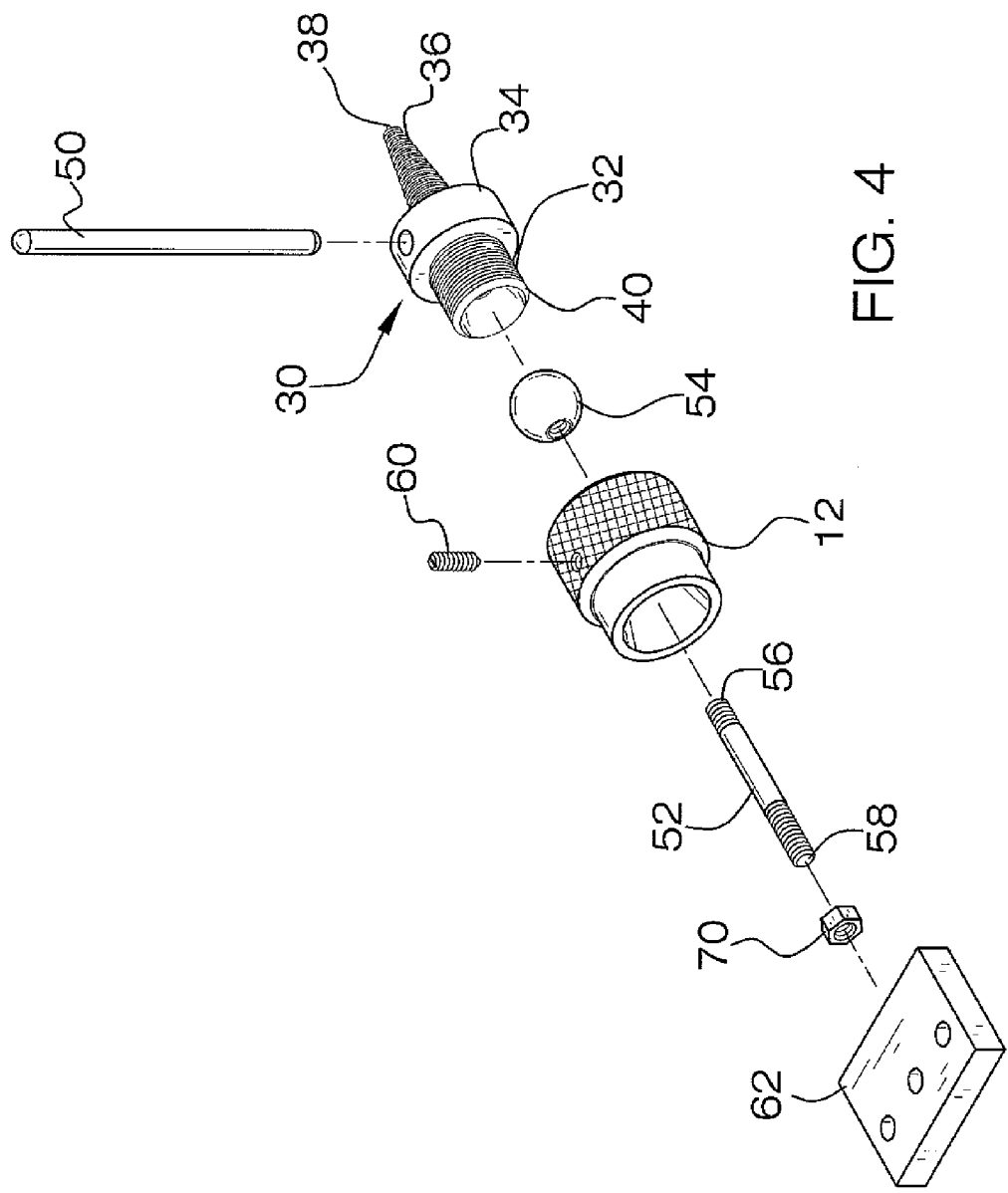
FIG. 4 is an exploded perspective view of an embodiment of the disclosure.
Figure 5:
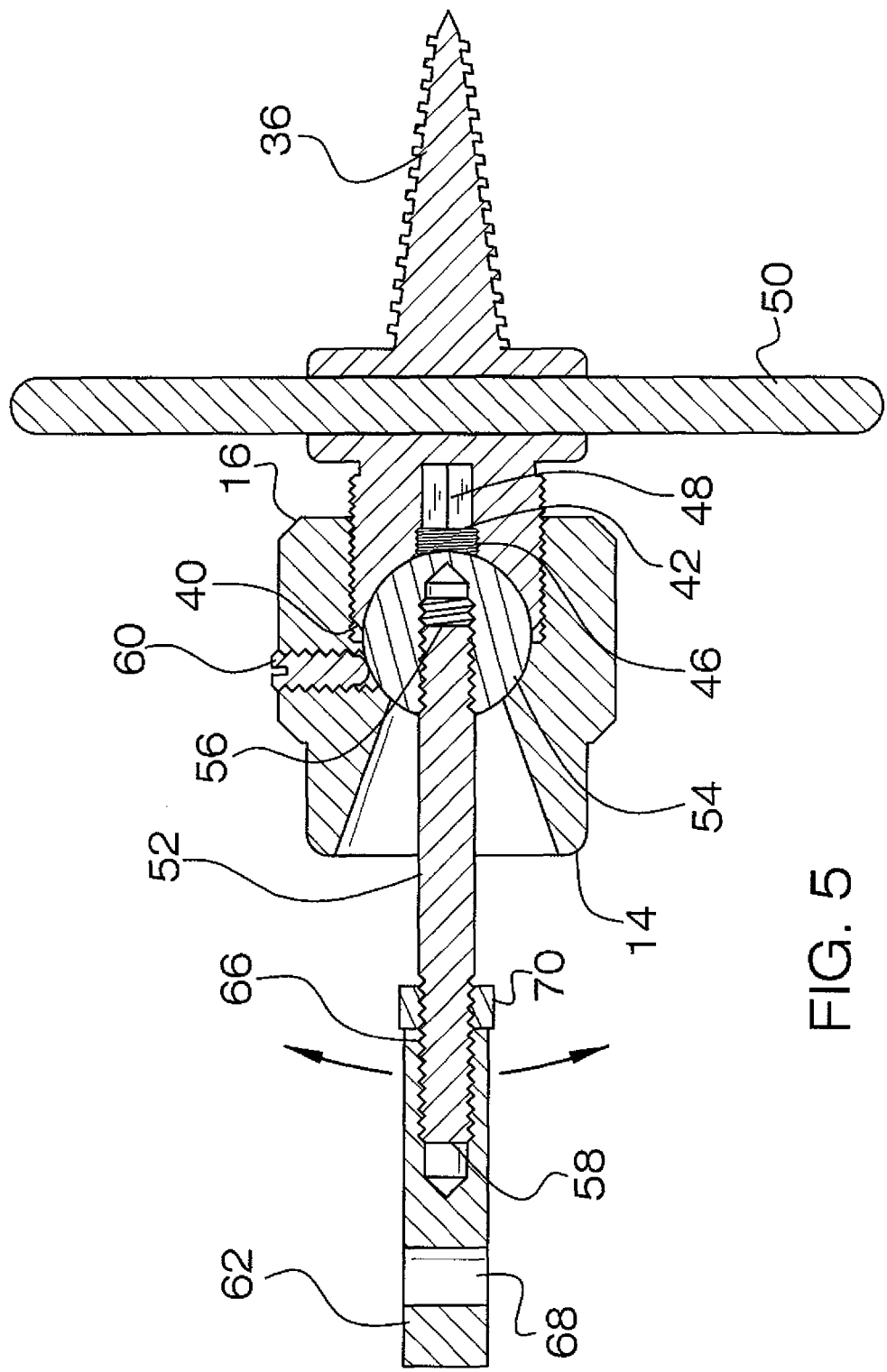
FIG. 5 is a cross-sectional view taken along line 5-5 of FIG. 2 of an embodiment of the disclosure.
Figure 6:
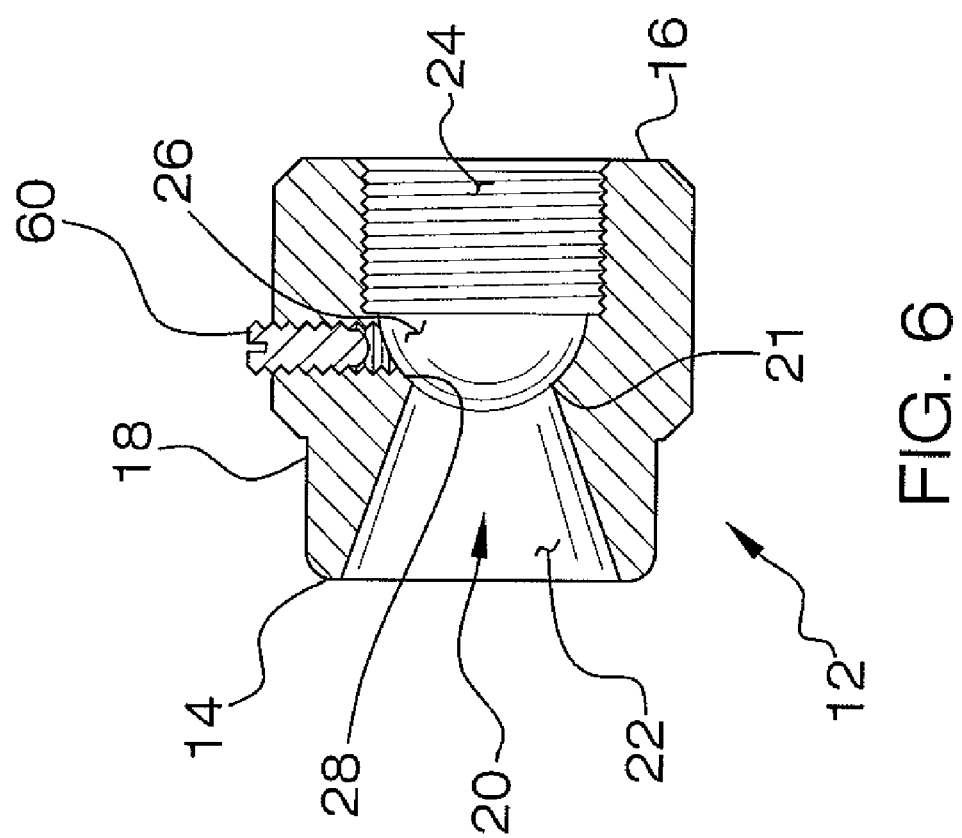
FIG. 6 is a side cross-sectional view of a housing of an embodiment of the disclosure.

A mounting panel 62 has a peripheral edge 64 having a threaded aperture 66 therein. One of the shaft ends 58 is extended into the threaded aperture 66 and threadably coupled to the mounting panel 62. This also allows the angle of the mounting panel 62 to be rotated to specific angle as needed. The mounting panel 62 has at least one hole 68 extending therethrough and, as shown in FIG. 4, may include multiple holes 68. A locking nut 70 is threadably coupled to the shaft 52 and is abuttable against the mounting panel 62 to prevent rotation of the mounting panel 62 with respect to the shaft. A conventional outdoor/wildlife capturing camera 6 may be positioned on the mounting panel 62 and a mounting screw 7 extended through the mounting panel 62 and into the camera 6. Alternatively, one of the shaft ends 58 may be extended into and threadably coupled to the camera 6 should the camera 6 have a rear wall with a threaded receiver built therein.

In use, the drill head 36 is bored into the tree trunk 8 as described above with the lever 50 or an electric drill. Once secured to the tree 8, the camera 6 may be mounted on the mounting panel 32 or directly to the shaft 52 and the shaft 52 may be attached to the housing 12 or directly to the boring member 30.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A camera mounting assembly to mount a camera to a tree, said assembly including:
    a housing having a first end, a second end and a perimeter wall extending between said first and second ends, said first and second ends being open, said housing having a passageway extending therethrough and through said first and second ends, said passageway having a peripheral wall bounding said passageway, said passageway including a first section adjacent to said first end, a second section adjacent to said second end and a central section positioned between said first and second sections;
    a boring member including a coupler, a central body attached to said coupler and a drill head being attached said central body opposite of said coupler, said drill head having a free end being pointed and said drill head being threaded to facilitate threadably boring said drill head into a tree trunk, said coupler being removably extended into and coupled to said second end of said housing;
    a shaft being extendable into said first end of said housing and into said central section, a fastener being positioned in said central section and engaging said shaft so that said shaft extends outwardly from said first end;
    a mounting panel having a peripheral edge coupled to said shaft distal to said first end of said housing, said mounting panel having at least one hole extending therethrough; and
    wherein a camera is mountable on said mounting panel after said drill head is extended into a tree to couple the camera to the tree.

2. The assembly according to claim 1, wherein said peripheral wall adjacent to said first end flares outwardly from said central section to said first end to allow an angle of said shaft with respect to said housing be selectively adjusted.

3. The assembly according to claim 2, wherein said first section has a frusto-conical shape.

4. The assembly according to claim 1, wherein said second section is tubular and is threaded, said coupler being threadably coupled to said second section.

5. The assembly according to claim 2, wherein said central section defines an arcuately concave saddle having a base abutting said first section, wherein a spherical object is extendable into said second end and abuttable against said base, said fastener comprising a ball threadably coupled to said shaft and being rotational within said saddle to allow an angle of said shaft to be selectively adjusted with respect to said first end of said housing.

6. The assembly according to claim 5, wherein said coupler is removably abutted against said ball to prevent rotation of said ball with respect to said housing.

7. The assembly according to claim 5, further including a lock screw being threadably extended into said housing and being removably abutted against said ball to retain a positioning of said ball with respect to said housing.

8. The assembly according to claim 2, wherein said coupler has an outer end positioned distal to said central body, said outer end having a central area having a well extending therein, said well defining a female coupler, said female coupler including a threaded portion and a faceted portion, said faceted portion being positioned between said threaded portion and said central body, wherein said shaft is removable from said ball and threadably couplable to said threaded portion of said female coupler.

9. The assembly according to claim 1, further including a lever to facilitate rotation of said boring member extending through said boring member, said lever being removably extended through said central body and being orientated perpendicular to a longitudinal axis of said boring member extending through said coupler and said free end.

10. A camera mounting assembly to mount a camera to a tree, said assembly including:
    a boring member including a coupler, a central body attached to said coupler and a drill head being attached said central body opposite of said coupler, said drill head having a free end being pointed and said drill head being threaded to facilitate threadably boring said drill head into a tree trunk, said coupler having an outer end positioned distal to said central body, said outer end having a central area having a well extending therein, said well defining a female coupler;
    a shaft having a pair of threaded shaft ends, one of said shaft ends being removably engaged with said female coupler;
    a mounting panel having a peripheral edge having a threaded aperture therein, one of said shaft ends being extended into said threaded aperture and threadably coupled to said mounting panel, said mounting panel having at least one hole extending therethrough; and wherein a camera is mountable on said mounting panel after said drill head is extended into a tree to couple the camera to the tree.

11. The assembly according to claim 10, wherein said female coupler includes a threaded portion and a faceted portion, said faceted portion being positioned between said threaded portion and said central body, said shaft being threadably coupled to said threaded portion.

12. The assembly according to claim 10, further including a lever to facilitate rotation of said boring member extending through said boring member.

13. The assembly according to claim 10, further including a locking nut being threadably coupled to said shaft and being abuttable against said mounting panel to prevent rotation of said mounting panel with respect to said shaft.

14. A camera mounting assembly to mount a camera to a tree, said assembly including:
- a housing having a first end, a second end and a perimeter wall extending between said first and second ends, said first and second ends being open, said housing having a passageway extending therethrough and through said first and second ends, said passageway having a peripheral wall bounding said passageway, said passageway including a first section adjacent to said first end, a second section adjacent to said second end and a central section positioned between said first and second sections, said peripheral wall adjacent to said first end flaring outwardly from said central section to said first end, said first section having a frusto-conical shape, said second section being tubular and being threaded, said central section defining an arcuately concave saddle having a base abutting said first section, wherein a spherical object is extendable into said second end and abuttable against said base;
- a boring member including a coupler, a central body attached to said coupler and a drill head being attached said central body opposite of said coupler, said drill head having a free end being pointed and said drill head being threaded to facilitate threadably boring said drill head into a tree trunk, said coupler being removably extended into and coupled to said second end of said housing, said coupler threadably engaging said second section of said passageway, said coupler having an outer end positioned distal to said central body, said outer end having a central area having a well extending therein, said well defining a female coupler, said female coupler including a threaded portion and a faceted portion, said faceted portion being positioned between said threaded portion and said central body;
- a lever to facilitate rotation of said boring member extending through said boring member, said lever being removably extended through said central body and being orientated perpendicular to a longitudinal axis of said boring member extending through said coupler and said free end;
- a shaft being extendable into said first end of said housing and into said central section, a fastener being positioned in said central section and engaging said shaft so that said shaft extends outwardly from said first end, said fastener comprising a ball threadably coupled to said shaft and being rotational within said saddle to allow an angle of said shaft to be selectively adjusted with respect to said first end of said housing, said shaft having a pair of shaft ends each being threaded, one of said shaft ends being threadably coupled to said fastener or to said threaded portion of said female coupler;
- said outer end of said coupler being releasably abutted against said ball to prevent rotation of said ball;
- a lock screw being threadably extended into said housing and being removably abutted against said ball to retain a positioning of said ball with respect to said housing;
- a mounting panel having a peripheral edge having a threaded aperture therein, one of said shaft ends being extended into said threaded aperture and threadably coupled to said mounting panel, said mounting panel having at least one hole extending therethrough, a locking nut being threadably coupled to said shaft and being abuttable against said mounting panel to prevent rotation of said mounting panel with respect to said shaft; and
- wherein a camera is mountable on said mounting panel after said drill head is extended into a tree to couple the camera to the tree.

* * * * *